United States Patent

[11] 3,550,690

| [72] | Inventor | Sherman H. Quanbeck |
| | | Aneta, N. Dak. 58212 |
| [21] | Appl. No. | 627,485 |
| [22] | Filed | Mar. 31, 1967 |
| [45] | Patented | Dec. 29, 1970 |

[54] SWINGING BEAM PLOW
19 Claims, 6 Drawing Figs.

[52] U.S. Cl. .................................................. 172/265, 172/271, 172/710
[51] Int. Cl. ..................................................... A01b 61/00, A01b 35/24
[50] Field of Search ............................................ 172/261–268, 705, 710

[56] References Cited
UNITED STATES PATENTS

| 2,944,613 | 7/1960 | Anderson ...................... | 172/266 |
| 1,020,908 | 3/1912 | Johnson ........................ | 172/265 |
| 3,032,122 | 5/1962 | Geurts .......................... | 172/264 |
| 3,242,994 | 3/1966 | McGee .......................... | 172/265 |

FOREIGN PATENTS

| 106,467 | 2/1939 | Australia ....................... | 172/264 |

Primary Examiner—Robert E. Pulfrey
Assistant Examiner—Stephen C. Pellegrino
Attorney—Dugger, Peterson, Johnson & Westman ABSTRACT: The present disclosure relates to an earthworking implement and particularly a moldboard plow bottom which is mounted for movement about a single pivot on a main frame, and which when moved will actuate a lever system which in turn will stress a spring to urge the plow bottom to return to its original position. The lever arrangement operates on a near center principle to hold the plow bottom initially with a high force, and as the plow swings about its pivot the springs are progressively tensioned so that the plow bottom will automatically return to its working position.

Two forms of the invention are shown. In both forms an actuating lever is pivoted to the rear of and substantially above the main beam pivot and upon swinging of the working tool about its main pivot the actuating levers move toward the main pivot to stress the spring. In one form of the invention the lever arm has a roller on the end that actually rolls against a portion on the pivoting beam as the unit is tripped and tensions a spring that is carried by this lever and also on the pivoting beam. The second form disclosed a two lever toggle link compressing a spring which is anchored onto the main plow frame itself. Shear bolts are provided so that if the plowshare should hook onto a rock and not move properly about its pivot, the shear bolt will shear to prevent damage to the moldboard itself.

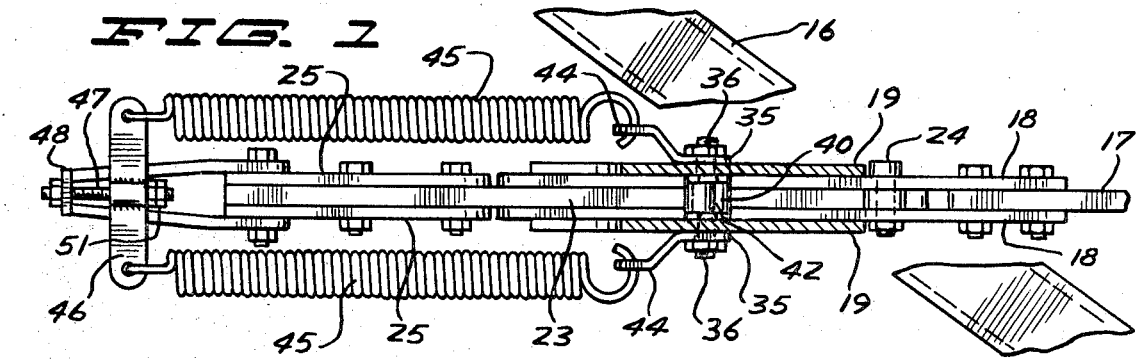
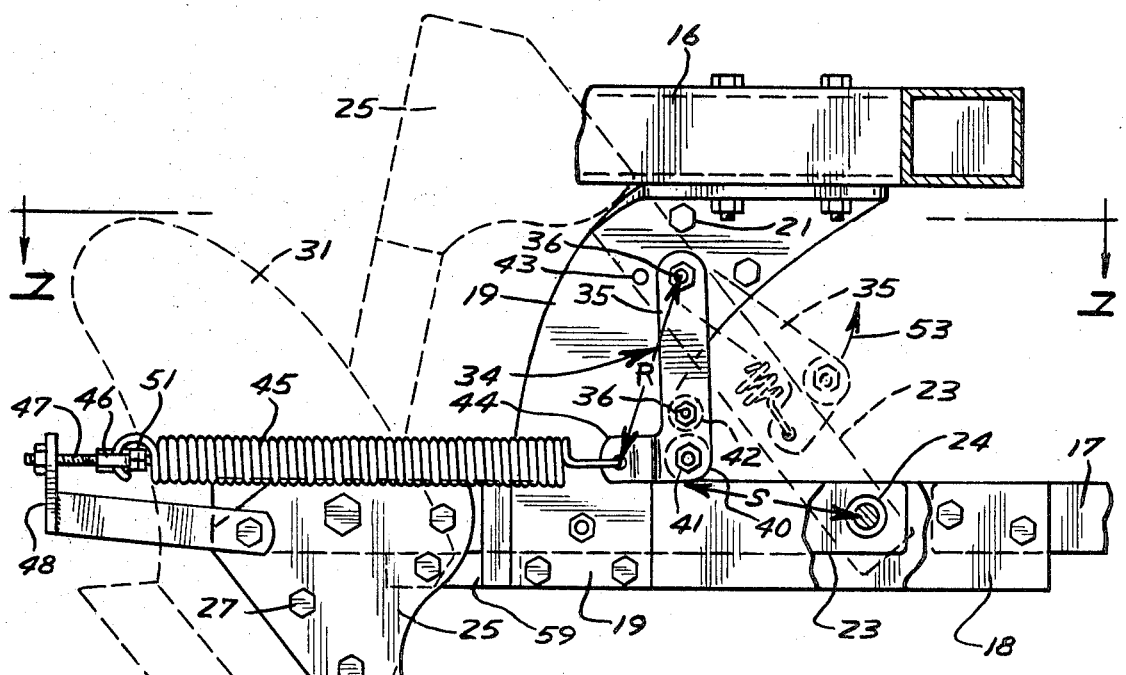

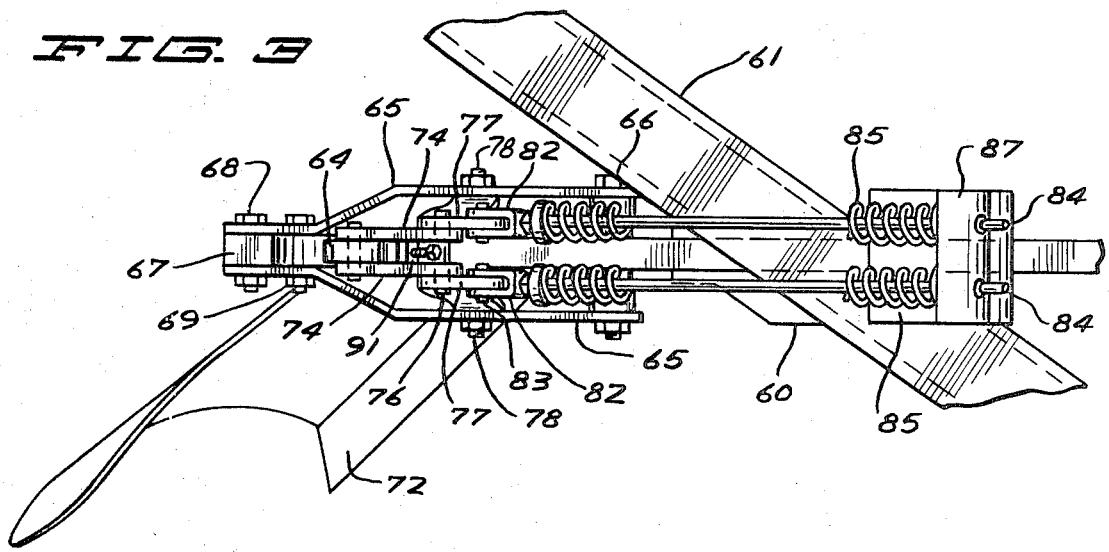
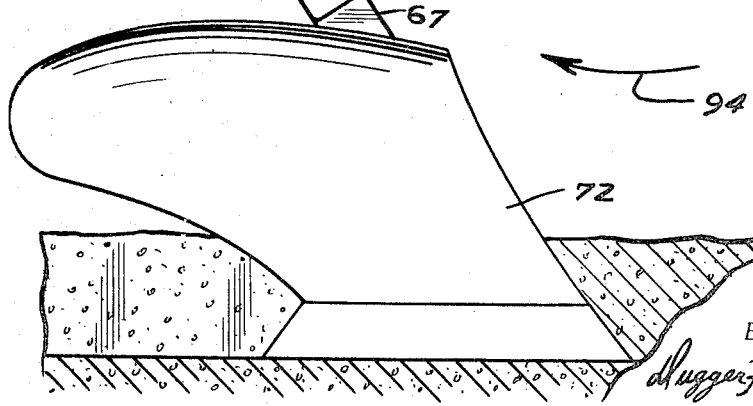

INVENTOR.
SHERMAN H. QUANBECK 3,550,690

SWINGING BEAM PLOW

BACKGROUND OF THE INVENTION

1. Field of the Invention

The present invention pertains to mechanisms for permitting ground working implements such as plows to pivot out of normal position when they strike an object and return to working position automatically.

2. Description of the Prior Art

There are many tripping mechanisms for ground working implements which have spring returns. For example, U.S. Pat. No. 2,724,315 to Roberson shows a plow tripping mechanism which has a pivoting lever located ahead of the pivot for the main plow share, and which requires a guide track for the roller that actuates a lever, which in turn stretches the spring. One of the main problems with this type of lever is getting good reliable holding in its working position. The patent to McGee Jr., U.S. Pat. No. 3,242,994 also shows a earthworking tool which pivots about a single pivot and in turn actuates a lever to tension the spring. Straight pivoting spring connections are shown in U.S. Pat. No. 3,098,582. Applicant's own pending application Ser. No. 499,805, filed Oct. 21, 1965 also illustrates a type of tripping mechanism using a lever that moves when the plow bottom pivots about one of two pivots that are mounted on the frame. Applicant's pending application, however, does not teach using this principle where only one pivot is provided for the plow beam.

In the present device, having good holding power when the plow is in working position and good reset pressure near the working position together with the ability to very closely adjust the releasing pressure, and also to diminish the force on the plow bottom and reduce total spring expansion as the plow bottom raises out of the ground is an important feature. Simplification of the structure by using only one mounting pivot is also a feature of the invention and this in connection with a shear bolt on the standard gives adequate protection for all situations.

SUMMARY OF THE INVENTION

The present invention thus relates to the improvement in mounting plow beams that includes mounting a lever which pivots when the plow beam trips and which in turn controls actuation of a spring that urges the plow beam back to its working position. The lever is pivoted above and to the rear of the pivoting beam pivot to give better control over the holding action of the trip and also to give very precise control of the force tending to return the bottom to its positioning of the points of actual working position. The invention finds its greatest utility in plowing or working earth where there are a great number of rocks encountered. The plow bottoms will trip out of the way of these rocks, will not be damaged, and the plow operator does not have to use extreme caution while he is plowing. The device eliminates many of the complicated overcenter tripping mechanisms previously advanced and further it is simple to make, thus reducing the cost of installation and manufacture. One form of the invention is shown in connection with a conventional plow frame and can be added to the plow frame as an attachment so that the owners of plows not having effective tripping beams can be afforded the benefits of the invention merely by attaching it to their existing plows.

BRIEF DESCRIPTION OF THE DRAWINGS

FIG. 1 is a fragmentary top plan view of a tripping plow bottom made according to the present invention and taken on line 1–1 of FIG. 2;

FIG. 2 is a side elevational view of a tripping plow bottom made according to the present invention;

FIG. 3 is a top plan view of a modified form of the present invention;

FIG. 4 is a side elevational view of the device of FIG. 3;

Figure 6:
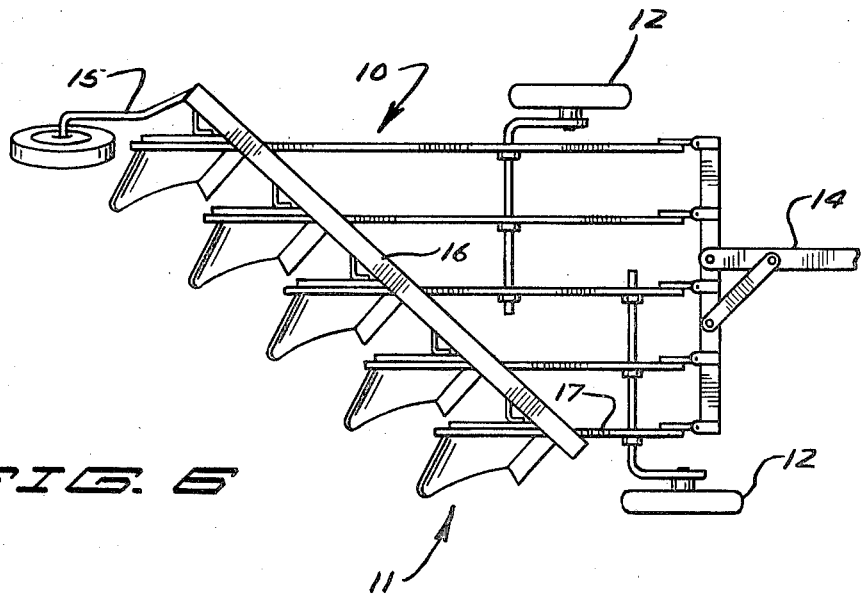
FIG. 6 is a top plan view of a schematic representation of a multiple beam plow utilizing trip beam assemblies as shown in the first form of the present invention.

First, referring to FIG. 6, there is shown a gang plow illustrated generally at 10 which as shown has five bottoms illustrated generally at 11. The plow is supported on wheels 12,12 and is controlled through a hydraulic cylinder (not shown) to raise and lower the entire plow. The plow is drawn through a conventional hitch 14 and has a tail wheel 15. Each of the bottom assemblies 11 is constructed to be individually tripping.

Referring specifically now to FIGS. 1 and 2, the first form of the tripping bottoms made according to the present invention is shown. The plow frame has an overhead beam 16 extending between and holding onto each of the longitudinally extending beams 17, that in turn support the individual tripping bottom assemblies 11. As shown, the beam 17 has two side guide plates 18 fixedly attached thereto and extending rearwardly therefrom. The guide plates are supported spaced from each other. At the rear portions of the guide plates a pair of upright standards 19 are located. These standards 19 extend upwardly and are attached to the crossbeam 16 with suitable bolts or other fastening means.

A swinging beam assembly 22 includes a horizontal pivoting beam 23 that is positioned between the guide plates 18 and is pivotally mounted onto a suitable pivot 24 extending between the guide plates. As shown, the pivot comprises a pin and the pin is mounted through a bushing to the pivoting beam 23. The beam 23 extends rearwardly beyond the guide plates 18 and has a pair of gusset plates 25,25 bolted thereto. The gusset plates extend down and a shank 26 is mounted between the gusset plates. The shank includes a pivot mounting bolt 27 and a shear bolt 28 that extend through the gusset plates and through the shank 26 to hold the shank in proper position. A moldboard assembly or earthworking tool 31 is mounted at the bottom of the shank. This earthworking tool engages the ground 32 and performs the work desired.

Lever means illustrated at 34 comprising two separate levers 35,35 positioned on the standards 19 are mounted onto separate coaxial pivot bolts 36,36. The pivot bolts 36 could be one continuous bolt except the space between the standards is kept unobstructed to permit maximum swing of the member 23 as it moves upwardly.

The levers 35,35 (they move as one lever in operation) extend downwardly from their pivots 36 and a roller 40 is mounted between the levers and on a suitable pin or bolt 41 forming a roller pivot axis. The roller 40 extends across between the lower ends of the levers and rides against the upper surface of the guides 18 and the horizontal pivoting beam 23. A spacer 42 is also mounted between the levers and engages the front edge of the standards 19 when the lever is in its down position as shown in FIG. 2. The spacer 42 regulates the stopping point of the lever with respect to the front edge of the standard. It can be eccentrically mounted to obtain adjustability.

A series of holes 43 can be provided in the standard so that the bolts 36 can be placed in different positions in order to get a different adjustment on the relationship of the lever to its near center position with respect to the axis of roller 40 and the force application direction.

The levers 35 have rearwardly projecting ears 44 and springs 45,45 are mounted onto these ears (one on each of the levers). The springs 45,45 extend rearwardly and are attached to a yoke 46 that is mounted onto a bolt 47. The bolt 47 is then mounted through an L-shaped bracket 48. The bolt 47 passes through an upright leg of this bracket 48 and the bracket 48 also has a pair of forwardly extending legs that are fixedly attached to the gusset plates 25. The yoke 46 has a not 51 welded to it so that the tension of the springs 45 can be adjusted by turning the bolt 47 into the nut 51.

When the moldboard 31 of the plow strikes a rock or other object in the ground, it will tend to rotate about pivot 24 in an arc 52 and in direction as indicated by the arrowhead. When it does this, the pivoting beam 23 will push against the roller 40 and because the axis of the roller 40 is positioned on the forward side of a plane that is defined by the pivotal axis of levers 35 (the axis of bolts 36) and extends parallel to the direction of force exerted by beam 23 on roller 40, the levers will tend to move together about their pivots in direction as indicated by the arrow 53. As the levers move about their pivot axis they will tension the springs 45 because of the positioning of the springs. At the same time the levers are moving to stretch the springs, the springs move with the member 23. When the trip beam assembly gets to its position as indicated in dotted lines in FIG. 2, the springs 45 will be stretched and will be urging the trip beam assembly back to its normal working position. Once the obstacle in the ground has been cleared, the springs acting on levers 35 and causing the roller 40 to bear against the top surface of pivot beam 23 force the beam 23 downwardly about its pivot 24 and reseat the earthworking tool in the ground in working position. A locking action takes place by having the pivotal axis of roller 40 approach the plane which is parallel to the force direction on the roller 23 and passes through the pivot of levers 35. If the axis of roller 40 and the line of contact between roller 40 and beam 23 lie on this plane and the beam would be locked against upward movement. Because of the leverage difference, the force required to move the moldboard from its working position will be greater than that which will be exerted by the springs after the lever has swung outwardly.

The radius S from the line of contact of roller 40 with beam 23 to the axis of beam 23 actually is like a lever having a moving pivot transmitting motion from beam 23 to levers 35. S is at the maximum with the beam 23 in the lower position.

The lever arm R from pivot 36 to attachment of the spring at 44 is at the maximum when the plow is in the operating position. This lever arm rapidly decreases as the main beam swings about 24. As the share 31 swings out at the ground, very little spring expansion occurs at the upper part of its arc 52, and subsequent force on the share is diminished. The weight of the bottom 31 will force the share downward after passing the obstacle and the force of the springs on roller 40 rapidly increases due to an increase in R as the beam 23 approaches normal working position. This reduction in both R and S as the beam swings upward allows full utilization of spring power in the lower part of the arc 52 of the beam where this force is needed for holding and reset power. Spring force and expansion is not wasted by the extended swinging at the top part of arc 52. Most of the spring expansion and force is expended near the lower part of arc 52 to give positive resetting power where needed and good holding force.

Two large springs 45 act together to hold the plow in normal working position and return the plow to its normal position after an obstacle causes the beam to trip up.

The springs are large enough to furnish the necessary holding force without going overcenter or approaching close to an overcenter condition. This makes this trip more reliable than an overcenter device which depends more on the overcenter action of pivots than the force of the spring for holding. These devices which go overcenter or very nearly on center are extremely susceptible to friction, dust and rust.

The device described here minimizes the effect of friction by using the large springs and keeping the pivots away from an on center or overcenter condition, resulting in a much more reliable trip, one which can be closely adjusted, and a trip which can furnish the large amount of power to reset the plow bottom automatically after an obstacle has caused tripping of the bottom.

A bar 59 is bolted between the plates 25,25 and extending into the beam plates 18,18. This bar may be replaced when worn, and gives added rigidity to the plow without adding to the depth of the beam 23 and plates 18,18.

A stop to limit the swinging of the beam 23 is provided by the spacer on the bolt 21.

Figure 5:
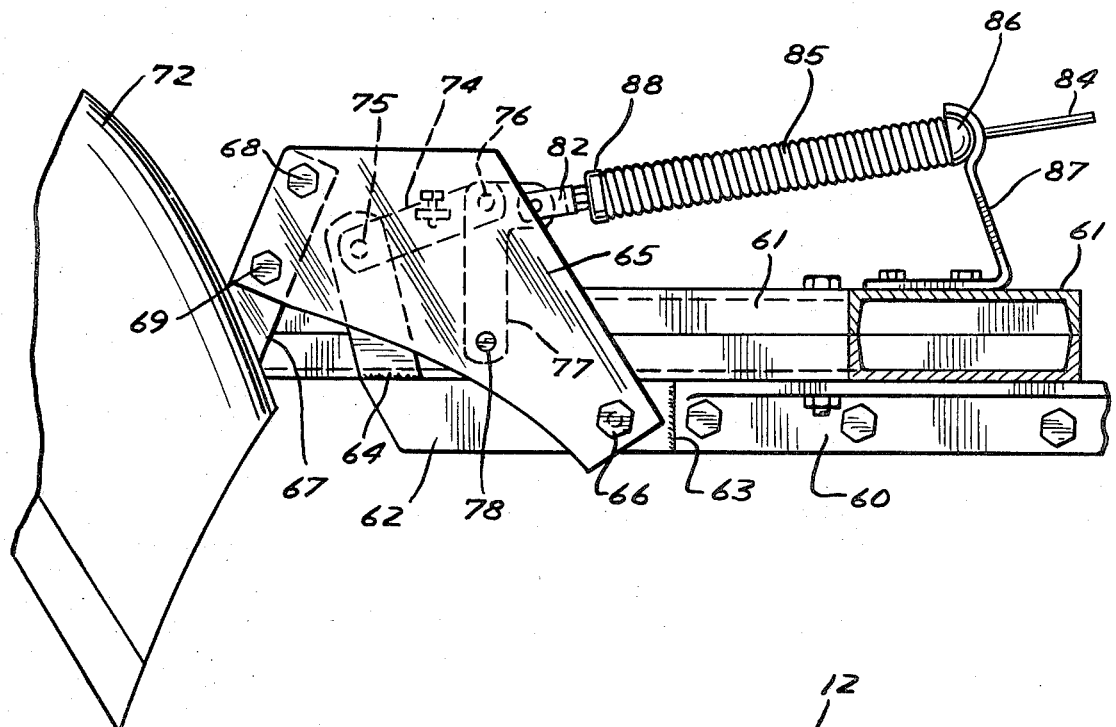
FIG. 5 is a side elevational view of the device of FIG. 4 shown in tripped position.

Referring now to a second form of the invention, there is shown FIGS. 3, 4 and 5 a unit that operates on the same principle as the previous form of the invention, but which can be attached to conventional plows that do not have a high overhead crossbeam.

As shown, a main beam 60 is provided and it is attached to a crossbeam 61 extending across all the beams of the plow in the same manner as the beam 16 extends across as shown in FIG. 5. The beam 61 is bolted, as shown, directly to the main beam 60 and thus has a lower clearance than the crossbeam in the first form of the invention. In order to utilize the device of the present invention on such plows having a main beam 60 and a crossbeam 61 bolted thereto, a tail beam 62 is bolted between plates 63 to the rear of the main beam 60. The tail beam 62 comprises a single width bar and has an upright mast 64 attached thereto. This mast is spaced rearwardly from the junction 63 between the main beam 60 and the tail beam 62. A pair of pivot plates 65 (together comprising a pivot beam) are pivotally mounted to the plates 63 with a pin 66, and pivoted about the axis of pin 66. This pivot pin can be used with a bushing if desired. A shank 67 is attached between the pivot plates with a pivot bolt 68 and a shear bolt 69 passed between the two plates and also through the shank 67. A moldboard 72 is mounted onto the shank 67 in a conventional manner.

Lever means illustrated generally at 73 are provided for controlling the up and down movement of the pivot plates and thus the moldboard 72 about pin 66. The lever means comprises a pair of levers 74,74 pivotally mounted about a pin 75 to the top portions of the mast 64. The levers 74,74 are positioned on opposite sides of this mast and operate simultaneously as one lever. These levers in turn are pivotally connected with suitable pins 76 to lower links or levers 77. The lower levers 77 (there are two) are pivotally mounted with suitable pins 78 to the plates 65,65. Thus, there is a jointed connection between the pivot plates 65,65 and the mast 64 that is fixed to the frame. The lower levers 77 are positioned on the insides of the plates 65 and are made so that they will clear the mechanism between these plates.

A separate rod end clevis 82 is mounted with a pin 83 over each of the ears. The clevises are attached to rods 84 which pass through the center of and guide a pair of compression coils springs 85. The rods pass through spherical washer seats 86 and then pass through provided openings in a bracket 87 that is fixed to the top of the crossbeam 61 in a suitable manner, such as welding. As shown, the two springs 85,85 are positioned in side-by-side relationship and the springs are under compression load. The lower spring guides 88 can ride against nuts or other adjustment devices so that the preload of compression on the springs 85 can be adjusted. The spherical washers 86 and their mating seats will permit the springs to pivot about their attachment point to the bracket without binding as the plow trips.

The levers 74,74 have a small crossbar 91 welded therebetween and a stop screw 92 is threadably mounted through this bar and engages the front surface of the mast 64. This permits an adjustable stop so that the position of the pivotal connection between upper lever 74 and lower levers 77 can be adjusted with respect to the plane defined as the axes of pivot pins 75 and 78. This gives a near center lock action to the two levers, and the closer they come to center, the more force is necessary from the pivot plate 65 in order to cause the release of the earthworking tool. The axis of pins 78 at their junction with levers 77 is the line of force transmission from the pivoting beam to levers 77. The plane passing through the axes of pins 75 and 78 is substantially parallel to the direction of force application from the gusset plates to the levers 77.

When the moldboard 72 strikes an object such as a rock in the ground, the force on the moldboard will tend to make it pivot about pivot 66 in direction as indicated by the arrow 94. This is resisted by the action of the lever means 74 and 77 and springs 85. When the forces are great enough, however, the levers will buckle away and compress springs 85 as the moldboard pivots upwardly. The tripped position is shown in FIG. 4. The springs 85 exert a force urging the plow to return to its normal plowing position. Once the moldboard has been reseated, the force necessary to trip the plow again will be what it was originally. Because of the changing effective lever arms for the action of springs 85, the greatest resetting force will result just at the time when the plow bottom is approaching its working position. This is when greatest force is needed.

Thus it can be seen that this form of the invention also includes lever means acting between a stationary portion of the main beam and the movable portion of the swinging beam to carry a biasing force from springs tending to return the swinging beam to its normal plowing position.

Because there is only one pivot 66 over the point of the share, if the moldboard should happen to hook onto a rock or other object and not pivot about the axis of bolt 66, the shear bolt 69 will shear to prevent damage to the plow moldboard. The feature of the second form of the invention is that it will trip easily and can be attached to conventional plows. In addition to this, the axis of pivot of bolt 66, and also the axis of pivot of pin 24 in the first form of the invention, are both immediately above the point of the plowshare on the moldboard 72. This means that the point will not dig down into the dirt deeper as it trips. This is common where the point of the plowshare earthworking tool is ahead of the pivot axis for the moldboard. The devices of the present invention thus give a clean swing about their pivots without digging into the ground and in both instances the lever means are positioned to the rear of and substantially above the pivot axis for the plow and act against spring force to tend to urge the plow toward its set position. The near center locking action of the lever means with the plowshare in the plowing position is adjustable.

The swing beams are made so they will pivot between 45° and 50° of arc to provide high clearance. Using the high overhead beam of the first form of the invention gives great stability to the plow frame, provides high trash clearance and permits the bottoms to swing high to clear obstacles.

I claim:

1. In an earthworking implement comprising a frame, an earthworking tool, support means for the earthworking tool, means to pivotally mount said support means to said frame about a single transverse axis only to permit movement of said earthworking tool toward and away from a working position engaging the ground, the improvement comprising means to resist pivotal movement of said earthworking tool away from its working position and to urge said earthworking tool to return to its working position comprising lever means pivotally mounted on said frame at a position substantially above and to the rear of the pivot of said earth working tool, transfer means between said lever means and said support means to cause movement of said lever means relative to the earthworking tool whenever said earthworking tool moves from its working position, said transfer means including a pivotal connection to said lever means, said pivotal connection to said lever means being substantially below the pivot axis of said lever means when the earthworking tool is in its working position, and said pivotal connection being above a horizontal plane passing through the pivotal axis for said earthworking tool, and bias means comprising spring means, means connecting said spring means to said lever at a point below the pivot of said lever means to said frame and positioned for yieldably resisting movement of said lever means from the position it assumes when said earthworking tool is in its working position.

2. The combination specified in claim 1 and means to attach said spring between said lever means and said pivoting beam.

3. The combination as specified in claim 1 wherein said lever means pivot is positioned above the axis of said roller a substantial distance.

4. The combination as specified in claim 1 wherein there are a plurality of earthworking tools pivotally mounted to separate portions of said frame, a crossmember positioned above said earthworking tools, separate upright standards extending between said frame portions and said crossmembers, and separate levers for each pivoting beam pivotally mounted to said standards below said crossmember and above the respective beams.

5. The combination as specified in claim 1 wherein said support means for said earthworking tool includes a pair of gusset plates pivotally mounted onto opposite sides of a main beam, said gusset plates moving together as a unit.

6. The combination as specified in claim 5 and a standard fixed to the rear portions of said gusset plates for supporting a plow moldboard, said standard being attached to said gusset plates with a pivot bolt adjacent the top sections thereof, and a bolt capable of being sheared from excessive forces on said moldboard adjacent the lower portion thereof.

7. The combination as specified in claim 5 wherein said transfer means includes a separate link pivotally mounted to each of said gusset plates, said pivotal connection being between said lever means and said link, said link moving to transfer force to cause said lever means to pivot about their axes as the gusset plates move with the earthworking tool from its working position.

8. The combination as specified in claim 7 wherein said bias means comprise compression springs attached to said links, bracket means attached to said main beam, said bracket means being positioned ahead of said pivot between the gusset plates and said main beam, and compression springs bearing against said bracket means.

9. The combination as specified in claim 6 and a mast fixed to and extending upwardly above said main beam and positioned to pass between said gusset plates as said gusset plates pivot said lever means being pivotally mounted to said mast.

10. The combination as specified in claim 9 and stop means on said lever means to prevent the pivotal connection between the lever means and said link from passing overcenter with respect to a reference plane passing through the pivotal axis between said gusset plates and said links.

11. The combination as specified in claim 10 wherein the reference plane is substantially parallel to the direction of effective force application to said links as said gusset plates pivot form their working position.

12. In an earthworking implement comprising a frame, an earthworking tool, support means for the earthworking tool, means to pivotally mount said support means to said frame about a transverse axis to permit movement of said earthworking tool toward and away from a working position engaging the ground, the improvement comprising means to resist pivotal movement of said earthworking tool away from its working position and to urge said earthworking tool to return to its working position comprising lever means pivotally mounted on said frame at a position substantially above and to the rear of the pivot of said earthworking tool, transfer means between said lever means and said support means to cause movement of said lever means relative to the earthworking tool whenever said earth working tool moves from its working position, and bias means yieldably resisting movement of said lever means from the position it assumes when said earthworking tool is in its working position, said bias means comprising tension spring means attached to said lever means at a first end thereof and attached to the support means for said earthworking tool at a second end thereof whereby the second end of said spring means moves with said earthworking tool when said tool moves from its working position.

13. The combination as specified in claim 12 and stop means to prevent movement of said lever means beyond a predetermined position as said earthworking tool returns to its working position.

14. The combination as specified in claim 13 wherein the transfer means transfers force from the earthworking tool to said lever means through a pivoting connection, and wherein said stop means is adjusted to control the relationship of said pivoting connection with respect to a plane parallel to the effective direction of force, from the earthworking tool on said transfer means and passing through the pivot axis of said lever means.

15. An earthworking implement comprising a frame, an earthworking tool, support means for the earthworking tool, means to pivotally mount said support means to said frame about a transverse axis to permit movement of said earthworking tool toward and away from a working position engaging the ground, the improvement comprising means to resist pivotal movement of said earthworking tool away from its working position and to urge said earthworking tool to return to its working position, comprising lever means pivotally mounted on said frame about a first pivotal axis positioned above and to the rear of the pivot of said earthworking tool, transfer means between said lever means and said support means to cause movement of said lever means relative to the earthworking tool whenever said earthworking tool moves from its working position, said transfer means including means movable in response to movement of said earthworking tool and receiving force from the support means along a contact line substantially parallel to the pivotal axis of the lever means, said transfer means being coupled to said lever means through a second pivotal axis connection substantially parallel to the contact line, said transfer means being of configuration such that the second pivotal axis between the transfer means and the lever moves toward the pivot of said support means for the earthworking tool when the earthworking tool moves from its working position, and said second pivotal axis approaches a plane extending parallel to the direction of force applied to said transfer means and lying along the first pivot axis of said lever means when the lever means returns to position with the earthworking tool in working position, and bias means acting between said lever and a portion of the earthworking implement yieldably resisting movement of said lever from the position said lever assumes when said earthworking tool is in its working position.

16. In an earthworking implement comprising a frame, an earthworking tool, support means for the earthworking tool including a beam member, means to pivotally mount said beam member to said frame about a transverse axis to permit movement of the earthworking tool toward and away from a working position engaging the ground, said beam member having an upper edge surface which is substantially planar, the improvement comprising means to resist pivotal movement of an earthworking tool away from its working position and to urge said earthworking tool to return to its working position comprising lever means pivotally mounted on said frame at a position above said beam member and to the rear of the pivot of said earthworking tool, a roller rotatably mounted for movement about a roller axis on said lever, said roller having an outer surface engaging the planar surface of said beam for rolling contact therewith, said lever pivot being positioned so that upon movement of said earthworking tool from its working position said roller rolls forwardly along said planar surface of said beam, and spring bias means connected between said lever and said earthworking implement yieldably resisting movement of said lever from the position said lever assumes when said earthworking tool is in its working position.

17. The combination of claim 16 and means to adjustably position the pivotal axis of said lever means so that a plane defined by the pivotal axis of said lever and extending parallel to the force direction between the beam and the roller at the line of contact between said roller and beam is adjacent to the roller axis when said ground-engaging tool is in its working position.

18. The combination as specified in claim 16 wherein said roller is rotatably mounted adjacent one end of said lever, and said lever is of length so that said roller axis is substantially below the pivotal axis of said lever when the earthworking tool is in its working position.

19. In an earthworking implement comprising a frame, an earthworking tool, support means for the earthworking tool including a beam having an actuating surface, means to pivotally mount said support means to said frame about a single transverse axis only to permit movement of said earthworking tool toward and away from a working position engaging the ground, the improvement comprising means to resist pivotal movement of said earthworking tool away from its working position and to urge said earthworking tool to return to its working position comprising lever means pivotally mounted on said frame at a position substantially above and to the rear of the pivot of said beam, transfer means between said lever means and said earthworking tool to cause movement of said lever means relative to the earthworking tool whenever said earthworking tool moves from its working position, said transfer means including a roller rotatably mounted on said lever means about a roller axis substantially below the pivot of said lever means when the earthworking tool is in its working position, said roller engaging said actuating surface and moving along said beam when the earthworking tool moves away from its working position, said roller axis being above a horizontal plane passing through the pivotal axis for said earthworking tool, and bias means between said lever means and a portion of said earthworking implement yieldably resisting movement of said lever means from the position it assumes when said earthworking tool is in its working position.

PO-1050
(5/69)

UNITED STATES PATENT OFFICE
CERTIFICATE OF CORRECTION

Patent No. 3,550,690              Dated February 15, 1971

Inventor(s) Sherman H. Quanbeck

It is certified that error appears in the above-identified patent and that said Letters Patent are hereby corrected as shown below:

Column 6, line 31 after the word "between" insert --said lever means and mast and through the pivotal axis between--.

Signed and sealed this 20th day of April 1971.

(SEAL)
Attest:

EDWARD M. FLETCHER, JR.          WILLIAM E. SCHUYLER, JR.
Attesting Officer                Commissioner of Patents